United States Patent
Friour et al.

(10) Patent No.: US 7,384,139 B2
(45) Date of Patent: Jun. 10, 2008

(54) INK FOR INKJET PRINTING

(75) Inventors: Gerard Amede Friour, Chalon sur Saone (FR); Olivier Jean Poncelet, Chalon sur Saone (FR)

(73) Assignee: Eastman Kodak Company, Rochester, NY (US)

( * ) Notice: Subject to any disclaimer, the term of this patent is extended or adjusted under 35 U.S.C. 154(b) by 551 days.

(21) Appl. No.: 11/034,531

(22) Filed: Jan. 12, 2005

(65) Prior Publication Data

US 2005/0159506 A1 Jul. 21, 2005

(30) Foreign Application Priority Data

Jan. 19, 2004 (FR) .................................. 04 00459

(51) Int. Cl.
*G01D 11/00* (2006.01)
(52) U.S. Cl. ...................... 347/100; 347/101; 523/160
(58) Field of Classification Search ................ 347/100, 347/95, 96, 101, 105; 106/31.6, 31.27, 31.13; 523/160

See application file for complete search history.

(56) References Cited

U.S. PATENT DOCUMENTS 3,909,286 A * 9/1975 Fitton .......................... 106/467
6,254,845 B1 7/2001 Ohashi et al.

FOREIGN PATENT DOCUMENTS

EP 120281 1/2001

* cited by examiner

*Primary Examiner*—Manish S. Shah
(74) *Attorney, Agent, or Firm*—J. Jeffrey Hawley; Andrew J. Anderson

(57) ABSTRACT

The present invention relates to ink for inkjet printing providing a printed image having improved stability, demonstrated by improved color fastness in time. Said ink includes at least particles of synthetic, substantially amorphous aluminosilicate polymer, the synthetic amorphous aluminosilicate polymer having an average diameter of 1 to 10 nm, wherein the aluminosilicate polymer exhibits an X-ray diffraction pattern that has weak peaks at about 2.2 and 3.3 Å.

9 Claims, 1 Drawing Sheet

INK FOR INKJET PRINTING

FIELD OF THE INVENTION

The present invention relates to ink for inkjet printing and an inkjet printing method using said ink.

BACKGROUND OF THE INVENTION

Digital photography has been growing fast for several years and the general public now has access to efficient and reasonably priced digital cameras. Therefore people are seeking to be able to produce photographic prints from a simple computer and its printer, with the best possible quality.

Many printers, especially those linked to personal office automation, use the inkjet printing technique. There are two major families of inkjet printing techniques: continuous jet and drop-on-demand.

Continuous jet is the simpler system. Pressurized ink ($3.10^5$ Pa) is forced to go through one or more nozzles so that the ink is transformed into a flow of droplets. In order to obtain the most regular possible sizes and spaces between drops, regular pressure pulses are sent using for example a piezoelectric crystal in contact with the ink with high frequency (up to 1 MHz) alternating current (AC) power supply. So that a message can be printed using a single nozzle, every drop must be individually controlled and directed. Electrostatic energy is used for this: an electrode is placed around the inkjet at the place where drops form. The jet is charged by induction and every drop henceforth carries a charge whose value depends on the applied voltage. The drops then pass between two deflecting plates charged with the opposite sign and then follow a given direction, the amplitude of the movement being proportional to the charge carried by each of them. To prevent other drops from reaching the paper, they are left uncharged: so, instead of going to the support they continue their path without being deflected and go directly into a container. The ink is then filtered and can be reused.

The other category of inkjet printer is drop-on-demand (DOD). This constitutes the base of inkjet printers used in office automation. With this method, the pressure in the ink cartridge is not maintained constant but is applied when a character has to be formed. In one widespread system there is a row of 12 open nozzles, each of them being activated with a piezoelectric crystal. The ink contained in the head is given a pulse: the piezo element contracts with an electric voltage, which causes a decrease of volume, leading to the expulsion of the drop by the nozzle. When the element resumes its initial shape, it pumps in the reservoir the ink necessary for new printings. The row of nozzles is thus used to generate a column matrix, so that no deflection of the drop is necessary. One variation of this system consists in replacing the piezoelectric crystals by small heating elements behind each nozzle. The drops are ejected following the forming of bubbles of solvent vapor. The volume increase enables the expulsion of the drop. Finally, there is a pulsed inkjet system in which the ink is solid at ambient temperature. The print head thus has to be heated so that the ink liquefies and can print. This enables rapid drying on a wider range of products than conventional systems.

The inks used in these various inkjet printers are either pigment-based ink, or dye-based ink. Generally speaking, a dye is a coloring material that dissolves in the ink vehicle. A pigment is a coloring material that is insoluble in the vehicle and that is dispersed or is a suspension, often stabilized by dispersing agents. The choice of a coloring material in inkjet systems is critical for image quality. In particular, the coloring matter has to enable a highly stable printed image to be obtained.

In general, the aqueous inks used in inkjet systems comprise a water-soluble dye, which is soluble in the ink vehicle such as water, or mixtures of water and organic co-solvents. It is known that dyes that enable very spectacular colors to be obtained tend to create printed images having poor stability in time, which is demonstrated by color density loss. Therefore, it is necessary to develop dye-based aqueous inks, which provide printed images having improved dye keeping properties and color stability in time.

SUMMARY OF THE INVENTION

The ink for inkjet printing according to the present invention is characterized in that it comprises at least particles of a synthetic, substantially amorphous aluminosilicate polymer, the synthetic, substantially amorphous aluminosilicate polymer having an average diameter of 1 to 10 nm, wherein the aluminosilicate polymer exhibits an X-ray diffraction pattern that comprises weak peaks at about 2.2 and 3.3 Å.

The ink for inkjet printing according to the present invention provides printed images having improved color stability in time.

The present invention also relates to an inkjet printing method using said ink comprising the following steps:
A) providing an inkjet printer that is responsive to digital data signals;
B) loading said printer with an inkjet recording element comprising a support and an ink-receiving layer
C) loading said printer with an inkjet ink such as described above, and
D) printing on said ink-receiving layer by using said inkjet ink in response to said digital data signals.

DETAILED DESCRIPTION OF THE INVENTION

Figure 1:
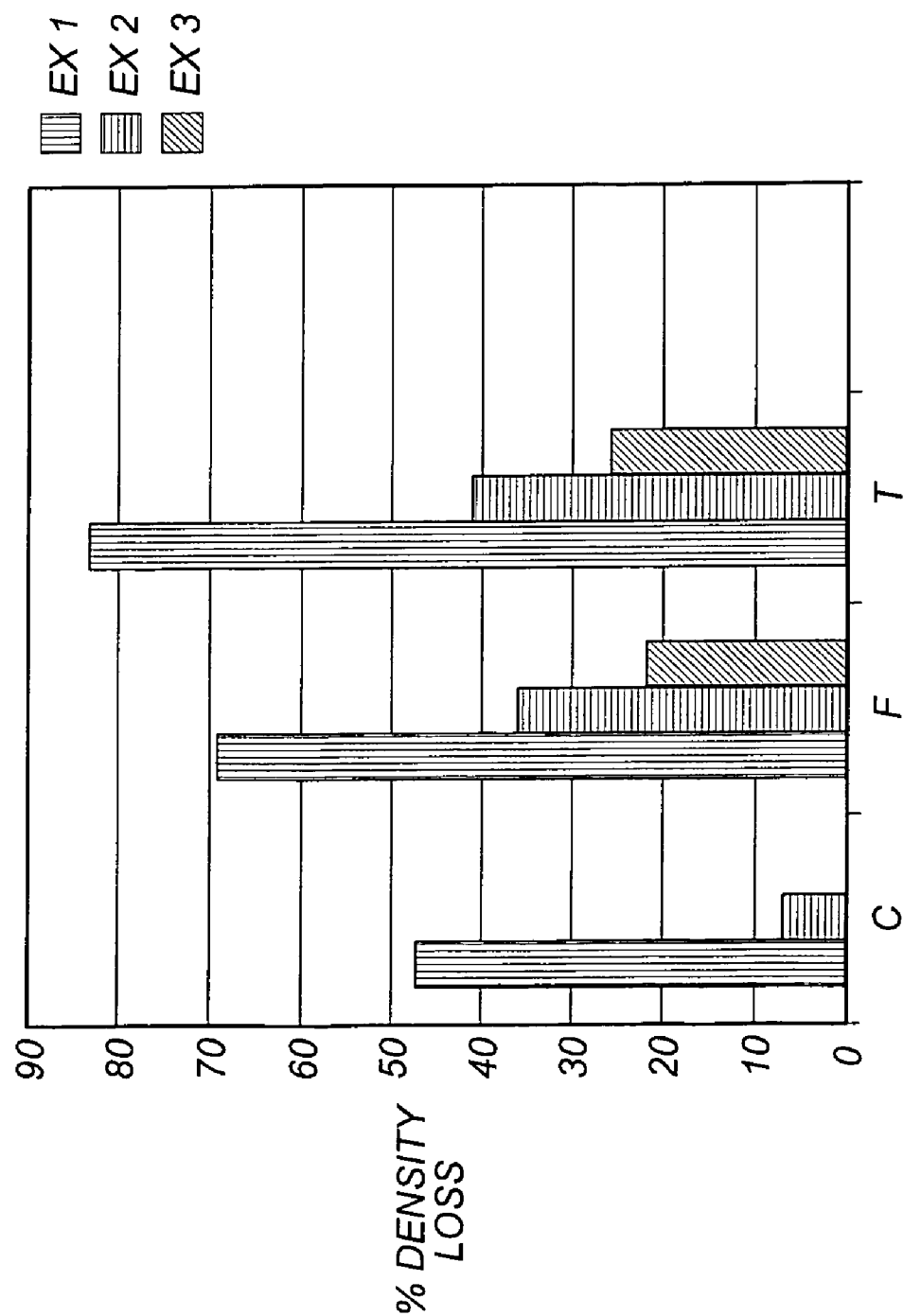
FIG. 1 represents the percentage of density loss for various inkjet recording elements printed with various comparative inks and according to the present invention and exposed to ozone.

The ink for inkjet printing comprises at least particles of a synthetic, substantially amorphous aluminosilicate polymer, the synthetic, substantially amorphous aluminosilicate polymer having an average diameter of 1 to 10 nm, wherein the aluminosilicate polymer exhibits an X-ray diffraction pattern that comprises weak peaks at about 2.2 and 3.3 Å. It is a polymeric aluminosilicate material having the formula:

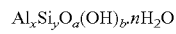

where the ratio of x:y is between 0.5 and 4, a and b are selected such that the rule of charge neutrality is obeyed; and n is between 0 and 10. The synthetic, substantially amorphous aluminosilicate polymer can comprise organic groups.

In a preferred embodiment, the polymeric aluminosilicate has the formula:

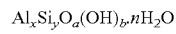

where the ratio of x:y is between 1 and 3.6, preferably 1 to 3, more preferably 1 to 2, and a and b are selected such that the rule of charge neutrality is obeyed; and n is between 0 and 10. More preferably, it is a substantially amorphous aluminosilicate, spherical or ring shaped, with a general molar ratio of Al to Si not more than 2:1.

The polymeric aluminosilicate can be obtained by the controlled hydrolysis by an aqueous alkali solution of a mixture of an aluminum compound such as halide, perchloric, nitrate, sulfate salts or alkoxides species $Al(OR)_3$, and a silicon compound such as alkoxides species, wherein the molar ratio Al/Si is maintained between 1 and 3.6 and the alkali/Al molar ratio is maintained between 2.3 and 3. Such materials are described in PCT patent application WO 2004/039724, hereby incorporated by reference in its entirety.

The polymeric aluminosilicate can be obtained by the controlled hydrolysis by an aqueous alkali solution of a mixture of an aluminum compound such as halide, perchloric, nitrate, sulfate salts or alkoxides species $Al(OR)_3$ and a silicon compound made of mixture of tetraalkoxide $Si(OR)_4$ and organotrialkoxide $R'Si(OR)_3$, wherein the molar ratio is maintained between 1 and 3.6 and the alkali/Al molar ratio is maintained 2.3 and 3. Such materials are described in PCT patent application WO 2004/009494, hereby incorporated by reference in its entirety.

The aluminosilicate of the present invention includes materials termed "synthetic allophane" or "allophane like." Synthetic allophane is typically in the form of substantially spherically or ring shaped aluminosilicate particles, including hollow spherical aluminosilicate particles, preferably having an average diameter of between about 3 nm to about 6 nm, preferably between 3.5 and 5.5 nm. In addition, synthetic allophanes, like natural allophanes, are substantially amorphous (P. Bayliss, Can. Mineral. Mag., 1987, 327), compared to, for example, imogolites which are crystalline and fibril shaped. Synthetic allophane differs from natural allophane (such as Allophosite® sold by Sigma) in that it does not contain iron. It may also be more amorphous and acidic. The synthetic allophane has a positive charge.

In more detail, a preferred method for preparing an aluminosilicate polymer as described above comprises the following steps:

a) treating a compound selected from the group consisting of a mixed aluminum and silicon alkoxide which only has hydrolyzable substituents, an unmodified mixed aluminum and silicon precursor resulting from the hydrolysis of a mixture of aluminum compounds and silicon compounds only having hydrolyzable substituents, a mixed aluminum and silicon alkoxide whose silicon has both hydrolyzable substituents and one non-hydrolyzable substituent, and a modified mixed aluminum and silicon precursor resulting from the hydrolysis of a mixture of aluminum compounds and silicon compounds only having hydrolyzable substituents and silicon compounds having three hydrolyzable substituents and one non-hydrolyzable substituent, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3;

b) stirring the mixture resulting from step a) at ambient temperature in the presence of silanol groups long enough to form the aluminosilicate polymer; and c) eliminating the byproducts formed during steps a) and b) from the reaction medium.

Throughout the present description, the expression "hydrolyzable substituent" means a substituent eliminated by hydrolysis during the process and in particular at the time of the treatment with aqueous alkali. This means that when the silicon atom only has three hydrolyzable substituents, it also has a non-hydrolyzable substituent that does not separate from the silicon atom during the process and in particular at the time of the treatment with the aqueous alkali. Such substituents are for example hydrogen, fluoride or an organic group.

In the following, the expression "unmodified mixed aluminum and silicon alkoxide" or "unmodified mixed aluminum and silicon precursor" means respectively a mixed aluminum and silicon alkoxide only having hydrolyzable substituents, or a mixed aluminum and silicon precursor resulting from the hydrolysis of a mixture of aluminum compounds and silicon compounds only having hydrolyzable substituents.

The expression "modified mixed aluminum and silicon alkoxide" means a mixed aluminum and silicon alkoxide in which the aluminum atom only has hydrolyzable substituents and the silicon atom has three hydrolyzable substituents and one non-hydrolyzable substituent.

Similarly, the expression "modified mixed aluminum and silicon precursor" means a precursor resulting from the hydrolysis of a mixture of aluminum compounds and silicon compounds only having hydrolyzable substituents and silicon compounds having three hydrolyzable substituents and one non-hydrolyzable substituent. This non-hydrolyzable substituent enables a hybrid aluminosilicate polymer material to be obtained.

More generally, an "unmodified" compound is a compound that only comprises hydrolyzable substituents and a "modified" compound is a compound that comprises one non-hydrolyzable substituent.

According to one embodiment, the unmodified mixed aluminum and silicon precursor can be formed in situ by mixing in aqueous medium (i) one compound selected from the group consisting of aluminum salts, aluminum alkoxides and aluminum halogenoalkoxides and (ii) at least one compound selected from the group consisting of silicon alkoxides and chloralkoxides only having hydrolyzable substituents, the silicon compound having at least three hydrolyzable substituents being selected to only have hydrolyzable substituents. The alkoxide radical of the unmodified aluminum compound or silicon compound preferably contains 1 to 5 carbon atoms, such as methoxide, ethoxide, n-propoxide, or i-propoxide.

Preferably, an aluminum salt, such as a halide (e.g. chloride or bromide), a perhalogenate, a sulfate, a nitrate, a phosphate or a carboxylate, and at least one unmodified silicon alkoxide, such as tetramethyl or tetraethyl orthosilicate is used.

A single unmodified silicon alkoxide or a mixture of unmodified silicon alkoxides, or a single unmodified silicon chloroalkoxide or a mixture of unmodified silicon chloroalkoxides, or a mixture of unmodified silicon alkoxides and chloroalkoxides can be used.

Preferably, an aluminum halide, such as chloride, and an unmodified silicon alkoxide only having hydrolyzable substituents is used. In practice, the mixture is made at ambient temperature between 15° C. and 35° C., preferably between 20° C. and 25° C., by adding the silicon alkoxide, pure or diluted in a co-solvent such as an alcohol, to the aluminum salt in aqueous solution, with stirring, until a clear homogeneous mixture is obtained. An unmodified mixed aluminum and silicon precursor is thus obtained. The stirring time varies from 10 to 180 minutes, and is preferably 120 minutes.

The aluminosilicate polymer material obtainable by the method defined above has a substantially amorphous structure shown by electron diffraction. This material is characterized in that its Raman spectrum comprises in spectral region 200-600 cm$^{-1}$ a wide band at 250±6 cm$^{-1}$, a wide intense band at 359±6 cm$^{-1}$, a shoulder at 407±7 cm$^{-1}$, and a wide band at 501±6 cm$^{-1}$, the Raman spectrum being produced for the material resulting from step (b) and before step (c).

According to another embodiment of the method for preparing the aluminosilicate polymer, a modified mixed aluminum and silicon precursor is used, which is formed in situ by mixing in aqueous medium (i) one compound selected from the group consisting of aluminum salts, aluminum alkoxides and aluminum halogenoalkoxides and (ii) at least one compound selected from the group consisting of unmodified silicon alkoxides and chloroalkoxides only having hydrolyzable substituents, and (iii) at least one compound selected from the group consisting of modified silicon alkoxides and chloroalkoxides having three hydrolyzable substituents and one non-hydrolyzable substituent.

The modified or unmodified alkoxide radical of the aluminum compound or silicon compound preferably contains 1 to 5 carbon atoms, such as methoxide, ethoxide, n-propoxide, or i-propoxide.

Preferably, an aluminum salt is used, such as a halide (e.g. chloride or bromide), a perhalogenate, a sulfate, a nitrate, a phosphate or a carboxylate. An aluminum halide, such as chloride, is particularly preferred.

Preferably, silicon compounds are used in the form of alkoxides.

A single unmodified silicon alkoxide or a mixture of unmodified silicon alkoxides, or a single unmodified silicon chloroalkoxide or a mixture of unmodified silicon chloroalkoxides, or a mixture of unmodified silicon alkoxides and chloroalkoxides can be used. Similarly, a single modified silicon alkoxide or a mixture of modified silicon alkoxides, or a single modified silicon chloroalkoxide or a mixture of modified silicon chloroalkoxides, or a mixture of modified silicon alkoxides and chloroalkoxides can be used.

Preferably, a mixture (i) of an aluminum halide and (ii) a mixture comprising at least one unmodified silicon alkoxide only having hydrolyzable substituents and at least one modified silicon alkoxide having three hydrolyzable substituents and one non-hydrolyzable substituent are produced.

An unmodified silicon alkoxide can be represented by the formula Si—(OR)$_4$, and a modified silicon alkoxide having three hydrolyzable substituents and one non-hydrolyzable substituent can be represented by the formula

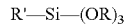

wherein R represents an alkyl group comprising 1 to 5 carbon atoms

R' represents H, F, or a substituted or unsubstituted linear or branched alkyl or alkenyl group, comprising 1 to 8 carbon atoms, e.g. a methyl, ethyl, n-propyl, n-butyl, 3-chloropropyl group, or a vinyl group.

Preferably, the unmodified silicon alkoxide is tetramethyl or tetraethyl orthosilicate, and the modified silicon alkoxide is methyltriethoxysilane or vinyltriethoxysilane.

The ratio of unmodified silicon alkoxide to modified silicon alkoxide is between 0.1 and 10 in moles of silicon, and is preferably about 1.

In practice, the unmodified silicon alkoxide and modified silicon alkoxide mixture is first produced pure or diluted in a co-solvent such as an alcohol. Said alcohol is preferably ethanol, used in sufficient amount to obtain a clear homogeneous mixture once the silicon compounds are mixed with the aluminum compound. Then, this mixture is added to the aluminum salt in aqueous solution, with stirring, at ambient temperature between 15° C. and 35° C., preferably between 20° C. and 25° C., until a clear homogeneous mixture is obtained. A modified mixed aluminum and silicon precursor is thus obtained. The stirring time varies from 10 to 240 minutes, and is preferably 120 minutes.

This material is characterized by a Raman spectrum similar to the material obtained in the previous synthesis, as well as bands corresponding to the silicon non-hydrolyzable substituent (bands linked to the non-hydrolyzable substituent can be juxtaposed with other bands), the Raman spectrum being produced for the material resulting from step (b) and before step (c). Said hybrid aluminosilicate polymer involving the introduction of functions, in particular organic functions into the inorganic aluminosilicate polymer enables a hybrid aluminosilicate polymer to be obtained in comparison to inorganic aluminosilicate polymers.

According to step a) of the method for preparing the aluminosilicate polymer, the precursor or an unmodified or modified mixed aluminum and silicon alkoxide is then put in contact with an aqueous alkali, the aluminum concentration being maintained at less than 0.3 mol/l, the Al/Si molar ratio being maintained between 1 and 3.6, and the alkali/Al molar ratio being maintained between 2.3 and 3. Advantageously, the aluminum concentration is between $1.5 \times 10^{-2}$ and 0.3 mol/l and even more preferably between $4.4 \times 10^{-2}$ and 0.3 mol/l. Preferably, the Al/Si molar ratio is between 1 and 2.

Preferably, an aqueous solution of sodium, potassium, or lithium hydroxide, diethylamine or triethylamine with a concentration between 0.5 M and 3 M, and preferably 3 M is used. The alkali can also be in the form of a hydroalcoholic solution.

The alkali is added to the unmodified or modified mixed aluminum and silicon alkoxide or precursor at a rate preferably between 50 and 650 mmole/hour.

The alkali in step a) is added in the presence of silanol groups. These groups can be supplied by glass or silica (glass wool) particles or beads, which have superficial hydroxy groups. When the volume of liquid to be treated is large, it may be desirable to increase the quantity of beads. The diameter of the beads can be between 0.2 and 5 mm and preferably between 1 and 3 mm. To simplify the implementation of the method for preparing the aluminosilicate polymer useful in the present invention, the preparation of the mixed aluminum and silicon precursor can also be performed in the presence of silanol groups, for example by circulating the mixture in a bed of glass beads.

After the addition of the alkali, step b) of the method for preparing the aluminosilicate polymer useful in the present invention consists in stirring the mixture resulting from step a) at ambient temperature in the presence of silanol groups long enough to form said aluminosilicate polymer.

Then, step c) of the method for preparing the aluminosilicate polymer comprises the elimination from the reaction medium of the byproducts formed during steps a) and b), such as the residual ions coming essentially from the alkali used in step a). The residual ions can be eliminated by washing, by successive sedimentation or by diafiltration. The aluminosilicate polymer material resulting from step c) can then be concentrated by centrifugation or nanofiltration.

When modified compounds comprising a non-hydrolyzable substituent are used, a hybrid aluminosilicate polymer is obtained. The introduction of non-hydrolyzable substituents, such as organic functions, enables providing for example an organophilic character to the resulting hybrid aluminosilicate polymers.

In a first embodiment of the method for preparing the aluminosilicate polymer, during step a) a quantity of alkali is added in order to obtain an alkali/Al molar ratio of about 2.3. In this case the pH is maintained between 4 and 5, and preferably between 4.2 and 4.3. Then step b) as described above is applied. The aluminosilicate polymer is thus obtained in dispersion form. Step c) to eliminate the residual ions can then be performed by diafiltration, followed by nanofiltration concentration.

In a second embodiment of the method for preparing the aluminosilicate polymer, during step a) a quantity of alkali is added in order to obtain an alkali/Al molar ratio of about 3. Then step b) as described above is applied. The aluminosilicate polymer is thus obtained in suspension form. Step c) to eliminate the residual ions can then be performed by diafiltration, followed by nanofiltration concentration, the aluminosilicate polymer having been previously redispersed by adding acid, such as hydrochloric or acetic acid or a mixture thereof.

In a third embodiment, the method for preparing the aluminosilicate polymer comprises an additional step d), after step b) and before step c). Said step d) comprises the addition in a few minutes of an additional quantity of aqueous alkali to reach an alkali/Al molar ratio of 3 if this ratio had not already been reached during step a). The aluminosilicate polymer is thus obtained in suspension form. Step c) to eliminate the residual ions can then be performed by diafiltration, followed by nanofiltration concentration, the aluminosilicate polymer having been previously redispersed by adding hydrochloric acid. Step c) can also be performed by washing with osmosed water by successive sedimentations, followed by centrifugation concentration.

The aluminosilicate polymer resulting from step c) followed by a concentration has physical gel form. The Al/Si molar ratio is between 1 and 3.6. Subsequent lyophilization enables the aluminosilicate polymer to be obtained as a powder. Such an aluminosilicate polymer can be characterized in that its Raman spectrum comprises in spectral region 200-600 $cm^{-1}$ a wide band at $250\pm6$ $cm^{-1}$, a wide intense band at $359\pm6$ $cm^{-1}$, a shoulder at $407\pm7$ $cm^{1}$, and a wide band at $501\pm6$ $cm^{-1}$, the Raman spectrum being produced for the aluminosilicate polymer resulting from step b) and before step c) and lyophilized. When modified compounds are used and when a hybrid aluminosilicate polymer is obtained, the Raman spectrum also comprises bands corresponding to the non-hydrolyzable silicon substituent, the bands linked to the non-hydrolyzable silicon substituent being capable of juxtaposing with the other bands.

Preferably the ink comprises between 2% and 20% by weight of aluminosilicate polymer compared with the total weight of the ink. When the aluminosilicate polymer as obtained above is used as a powder to prepare the ink, this powder must be very fine.

The ink also comprises a vehicle, water-soluble solvents, colorants (dyes for example), surfactants and other additives such as biocides, buffers, chelating agents, defoamers, etc.

The vehicles are extremely varied and are generally mixtures of water and organic solvents.

Water can be generally the vehicle's main constituent, representing between 51 percent and 90 percent by weight of the ink. Preferably de-ionized water is used.

Organic solvents or co-solvents are generally water-soluble solvents. They represent between 5% and 49% by weight of the ink. One or more solvents can be used. The solvents are used as humectants or to control the viscosity of the ink. These solvents can be: lactams, such as 2-pyrrolidone, N-methyl-pyrrolid-2-one (NMP), 1,3-dimethylimidazolid-2-one, and octyl-pyrrolidone; diols such as ethanediols (e.g. 1-2-ethanediol), propanediols (e.g. 1,2-propanediol, 1,3-propanediol, 2-ethyl-2-hydroxy-methyl-1,3-propanediol, ethylhydroxypropanediol), butanediols (e.g. 1,2-butanediol, 1,3-butanediol, 1,4-butanediol), pentanediols (e.g. 1,5-pentanediol), hexanediols (e.g. 1,2-hexanediol, 1,6-hexanediol, 2,5-hexanediol), heptanediols (e.g. 1,2-heptanediol, 1,7-heptanediol), octanediols (e.g. 1,2-octanediol, 1,8-octanediol); glycols, glycol ethers and thioglycol ethers, generally used for inkjet ink, such as polyalkylene glycols such as polyethylene glycols (e.g. diethylene glycol (DEG), triethylene glycol, tetraethylene glycol), polypropylene glycols (e.g. dipropylene glycol, tripropylene glycol, tetrapropylene glycol), polymer glycols (e.g. PEG 200, PEG 300, PEG 400, PPG 400), ethoxyl glycerols, and thiodiglycol. These solvents are generally used as humectants. Other solvents, such as alcohols, ketones or ethers can be used to help the ink to penetrate into the ink-receiving layer.

The dyes used can be generally directly soluble in water. Preferably acid type dyes are used. Dyes useful in the present invention can be the dyes. Direct Blue 199 (CAS 12222-04-7), Direct Yellow 132 (CAS 10114-86-0), Direct Yellow 86 (CAS 50925-42-3), Acid Yellow 17 (CAS 6359-98-4), Acid Yellow 23 (CAS 1934-21-0), Acid Red 52 (CAS 3520-42-1), Reactive Red 180 (CAS 98114-32-0). The ink can comprise from 0.05% to 10% by weight of dyes.

The surfactants comprise cationic, anionic, zwitterionic or non-ionic surfactants. The ink can comprise from 0.01% to 10% by weight of surfactant.

The ink can also comprise biocides (0.05-5% by weight) and pH control agents (0.1-10% by weight).

The ink is obtained by mixing all the constituents. It can be used for inkjet printing on any support suitable for this technology and known. The ink provides printed images having improved dye keeping properties and color stability in time.

The following examples illustrate the present invention without however limiting the scope.

1) Preparation of Aluminosilicate Polymer 4.53 moles $AlCl_3$, $6H_2O$, then 2.52 moles tetraethyl orthosilicate were added to 100 l osmosed water. This mixture was stirred and circulated simultaneously through a bed formed of 1 kg of glass beads 2-mm diameter using a pump with 8 l/min output. The preparation operation of the unmodified mixed aluminum and silicon precursor lasted 120 minutes. Then, according to step a) of the preparation method, 10.5 moles NaOH 3M were added to the precursor in two hours. The reaction medium clouded. According to step b) of the preparation method, the mixture was stirred for 15 to 20 hours. The medium became clear. The circulation was stopped in the glass bead bed. Then, according to step d) of the method for preparing the aluminosilicate polymer, 3.09 moles NaOH 3M were added in ten minutes. The aluminum concentration was $4.4\times10^{-2}$ mol/l, Al/Si molar ratio 1.8 and alkali/Al ratio 3. The aluminosilicate polymer was thus obtained as a suspension. Step c) of the preparation method consisted in adding 165 g HCl 37% first diluted ten times and stirring for 150 minutes to obtain a dispersion of the aluminosilicate polymer that is left to stand. The dispersion was then diafiltrated using a Filmtec® NF 2540 nanofiltration membrane (surface area 6 m²) to eliminate the sodium salts to achieve an Al/Na ratio greater than 100. The retentate resulting from the diafiltration by nanofiltration was concentrated to obtain a gel with about two % by weight of aluminum. 115 g of HCl 37% was added to 2 kg of this gel, and then 317 g of water, i.e. 15% of the weight of the gel engaged, was distilled. A gel was obtained that was then lyophilized to obtain a solid of constant mass. The aluminosilicate polymer was then obtained as a powder (230 g).

2) Preparation of the Inks

The inks were prepared using Rhodamine B as dye (CAS 81-88-9)

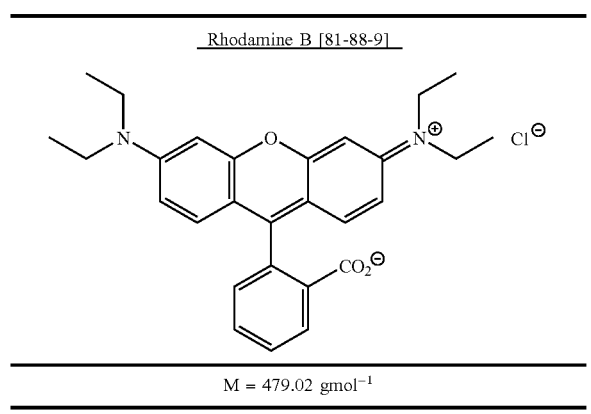

Rhodamine B [81-88-9]

M = 479.02 gmol⁻¹

A pre-mixture was produced having composition 1 obtained by mixing with magnetic stirring:

| Composition 1 | |
|---|---|
| 2-pyrrolidone | 2.0 g |
| 1,5 pentane diol | 2.5 g |
| Trimethylol propane | 2.2 g |
| Rhodamine B | 120 mg |
| Water qs | 10 g |

Various inks were prepared by mixing composition 1 with the aluminosilicate polymer prepared according to paragraph 1 and dissolved 15% in water, by magnetic stirring until a clear medium was obtained.

The inks obtained correspond to the examples given in table I below:

TABLE I

| Component | Comparative Example 1 | Example 2 (invention) | Example 3 (invention) |
|---|---|---|---|
| Composition 1 | 2 g | 2 g | 2 g |
| Alumino-silicate polymer 15% in water | 0 | 2 g | 4 g |
| Water qs | 6 g | 6 g | 6 g |

3) Evaluation of the Dye Keeping Properties and the Image Stability

The inks of examples 1 to 3 were used to print strips of various photographic quality inkjet recording elements available on the market: Canon PRO PR101 (245 g/m²), Fuji Super Photograde WPA420 (245 µm) and Tetenal "high glossy" 131368 (264 g/m²) papers.

To assess the dye keeping properties and image stability, a dye fading test by exposure to ozone was performed for each resulting paper strip. For this, the various strips of paper printed with the various inks were analyzed using an X-Rite™ densitometer Model 820 that measures colors by reflection. Then the paper strips were placed in the dark in a room with controlled ozone atmosphere (60 ppb) for three weeks. At the end of the three weeks, any degradation of the color density was measured using the densitometer.

FIG. 1 represents the density loss percentage of the image color printed with the ink of examples 1 to 3 on the Canon (reference C), Fuji (reference F) and Tetenal (reference T) papers. The density loss of the color printed on the Canon paper using the ink of Example 3 was zero.

It may be noted that the inkjet papers printed with an ink containing an aluminosilicate polymer, according to the present invention, have better dye keeping and thus better image stability than papers printed with an ink not containing an aluminosilicate polymer used in the present invention.

The invention claimed is:

1. An ink for inkjet printing, characterized in that it comprises at least particles of a synthetic, substantially amorphous aluminosilicate polymer, the synthetic, substantially amorphous aluminosilicate polymer having an average diameter of 1 to 10 nm, and having the formula:

$$Al_xSi_yO_a(OH)_b \cdot nH_2O$$

where the ratio of x:y is between 0.5 and 4, a and b are selected such that the rule of charge neutrality is obeyed, and n is between 0 and 10, wherein the aluminosilicate polymer exhibits an X-ray diffraction pattern that comprises weak peaks at about 2.2 and 3.3 Å.

2. The ink of claim 1 wherein the synthetic, substantially amorphous aluminosilicate polymer comprises organic groups.

3. The ink of claim 1 where the ratio of x:y is between 1 and 3.6.

4. The ink of claim 1 wherein the average particle size of the synthetic, substantially amorphous particles is in the range from about 3 nm to about 6 nm.

5. The ink of claim 1 wherein the synthetic, substantially amorphous aluminosilicate polymer is a synthetic allophane with essentially no iron atoms.

6. The ink of claim 1 wherein the synthetic, substantially amorphous aluminosilicate polymer is a synthetic allophane having a positive charge.

7. The ink according to claim 1, wherein it comprises between 2 and 20% by weight of said aluminosilicate polymer compared with the total weight of the ink.

8. An ink for inkjet printing, characterized in that it comprises a vehicle, a colorant and at least particles of a synthetic, substantially amorphous aluminosilicate polymer, the synthetic, substantially amorphous aluminosilicate polymer having an average diameter of 1 to 10 nm, and having the formula:

$$Al_xSi_yO_a(OH)_b \cdot nH_2O$$

where the ratio of x:y is between 0.5 and 4, a and b are selected such that the rule of charge neutrality is obeyed, and n is between 0 and 10, wherein the aluminosilicate polymer exhibits an X-ray diffraction pattern that comprises weak peaks at about 2.2 and 3.3 Å.

9. An inkjet printing method comprising the following steps:

A) providing an inkjet printer that is responsive to digital data signals;

B) loading said printer with an inkjet recording element comprising a support and an ink-receiving layer C) loading said printer with an inkjet ink comprising at least particles of a synthetic, substantially amorphous aluminosilicate polymer having an average diameter of 1 to 10 nm, and having the formula:

$$Al_xSi_yO_a(OH)_b \cdot nH_2O$$

where the ratio of x:y is between 0.5 and 4, a and b are selected such that the rule of charge neutrality is obeyed, and n is between 0 and 10, wherein the aluminosilicate polymer exhibits an X-ray diffraction pattern that comprises weak peaks at about 2.2 and 3.3 Å; and D) printing on said ink-receiving layer by using said inkjet ink in response to said digital data signals.

* * * * *